United States Patent
Zhang et al.

(10) Patent No.: US 11,436,449 B2
(45) Date of Patent: Sep. 6, 2022

(54) METHOD AND ELECTRONIC APPARATUS FOR PROCESSING IMAGE AND TRAINING IMAGE TAG CLASSIFICATION MODEL

(71) Applicant: BEIJING DAJIA INTERNET INFORMATION TECHNOLOGY CO., LTD., Beijing (CN)

(72) Inventors: Zhiwei Zhang, Beijing (CN); Fan Yang, Beijing (CN)

(73) Assignee: BEIJING DAJIA INTERNET INFORMATION TECH. CO., LTD., Beijing (CN)

( * ) Notice: Subject to any disclaimer, the term of this patent is extended or adjusted under 35 U.S.C. 154(b) by 59 days.

(21) Appl. No.: 17/035,235

(22) Filed: Sep. 28, 2020

(65) Prior Publication Data

US 2021/0056344 A1 Feb. 25, 2021

Related U.S. Application Data

(63) Continuation of application No. PCT/CN2018/122540, filed on Dec. 21, 2018.

(30) Foreign Application Priority Data

Mar. 27, 2018 (CN) .......................... 201810260522.3

(51) Int. Cl.
*G06K 9/62* (2022.01)
*G06N 3/04* (2006.01)

(52) U.S. Cl.
CPC .......... *G06K 9/627* (2013.01); *G06K 9/6256* (2013.01); *G06K 9/6277* (2013.01); *G06N 3/04* (2013.01)

(58) Field of Classification Search
None
See application file for complete search history.

(56) References Cited

U.S. PATENT DOCUMENTS

| 2010/0215254 | A1 | 8/2010 | Prokhorov |
| 2016/0140408 | A1 | 5/2016 | Shen et al. |
| 2017/0206431 | A1* | 7/2017 | Sun ..................... G06F 16/5838 |

FOREIGN PATENT DOCUMENTS

| CN | 105678309 A | 6/2016 |
| CN | 106599869 A | 4/2017 |
| CN | 106815566 A | 6/2017 |
| CN | 106951911 A | 7/2017 |
| CN | 107220667 A | 9/2017 |
| CN | 107239785 A | 10/2017 |

(Continued)

OTHER PUBLICATIONS

International Search Report and Written Opinion of corresponding PCT Application No. PCT/CN2018/122540—15 pages (dated Mar. 7, 2019).

(Continued)

*Primary Examiner* — Leon Flores
(74) *Attorney, Agent, or Firm* — Knobbe Martens Olson & Bear LLP

(57) ABSTRACT

An image processing method can include: acquiring an image; determining a feature map of the image based on an image tag classification model, wherein the image tag classification model comprises a plurality of classification tasks; and determining tags corresponding to the feature map based on the classification tasks, wherein each of the tags comprises a probability value.

15 Claims, 4 Drawing Sheets

(56) References Cited

FOREIGN PATENT DOCUMENTS

| | | |
|---|---|---|
| CN | 108664989 A | 10/2018 |
| EP | 3291146 A1 | 3/2018 |

OTHER PUBLICATIONS

First Office Action of corresponding Chinese Application No. 201810260522.3—15 pages (dated Mar. 25, 2019).

Second Office Action of corresponding Chinese application No. 201810260522.3—13 pages (dated Jun. 24, 2019).

Notification to Grant Patent Right for Invention of corresponding Chinese Application No. 201810260522.3—4 pages (dated Sep. 27, 2019).

\* cited by examiner

METHOD AND ELECTRONIC APPARATUS FOR PROCESSING IMAGE AND TRAINING IMAGE TAG CLASSIFICATION MODEL

The present application claims priority to International Application No. PCT/CN2018/122540, filed on Dec. 21, 2018 and entitled "IMAGE TAG DETERMINATION METHOD AND DEVICE, AND TERMINAL", which claims priority to Chinese Patent Application No. 201810260522.3, filed on Mar. 27, 2018, and the entire contents of these applications are incorporated herein by reference.

TECHNICAL FIELD

The present disclosure relates to the field of image processing, and in particular, relates to an image processing method, a training method for an image tag classification model, an electronic apparatus and a storage medium.

BACKGROUND

Deep learning has been widely applied to video images, voice recognition, natural language processing and related fields. An image tag classification model can be trained through deep learning, an image can be classified through the image tag classification model, and a tag can be given to the image, instead of manually processing the image. Usually, one image tag classification model is trained for one classification task, of which the image tag classification model can meet the classification requirements.

SUMMARY

Embodiments of the present disclosure provide an image processing method, a training method for an image tag classification model, an electronic apparatus and a storage medium.

According to an aspect of the present disclosure, an image processing method applied to an electronic apparatus is provided. The method includes: acquiring an image; determining a feature map of the image based on an image tag classification model, wherein the image tag classification model includes a plurality of classification tasks; and determining tags corresponding to the feature map based on the classification tasks, wherein each of the tags includes a probability value.

According to another aspect of the present disclosure, a training method for an image tag classification model is provided. The method is applied to an electronic apparatus, and the method includes: acquiring sample images corresponding to each of a plurality of classification tasks, wherein each of the sample images has tag data, the tag data includes a classification task to which the sample image belongs and a target tag corresponding to the sample image under the classification task, and a probability value corresponding to the target tag is 1 and each of probability values corresponding to other tags is 0 in a classification result of the sample image under the classification task to which the sample image belongs; and training the image tag classification model based on the sample images corresponding to each of a plurality of classification tasks.

According to yet another aspect, an electronic apparatus is provided. The electronic apparatus includes: at least one memory, at least one processor and one or more program stored in the at least one memory, wherein the one or more program is capable of running on the at least one processor, and the one or more program implements following steps of an image processing method when being executed by the at least one processor: acquiring an image; determining a feature map of the image based on an image tag classification model, wherein the image tag classification model includes a plurality of classification tasks; and determining tags corresponding to the feature map based on the classification tasks, wherein each of the tags includes a probability value.

According to still yet another aspect, an electronic apparatus is provided. The electronic apparatus includes: at least one memory, at least one processor and one or more program stored in the at least one memory, wherein the one or more program is capable of running on the at least one processor, and the one or more program implements following steps of a training method for an image tag classification model when being executed by the at least one processor: acquiring sample images corresponding to each of a plurality of classification tasks, wherein each of the sample images has tag data, the tag data includes a classification task to which the sample image belongs and a target tag corresponding to the sample image under the classification task, and a probability value corresponding to the target tag is 1 and each of probability values corresponding to other tags is 0 in a classification result of the sample image under the classification task to which the sample image belongs; and training the image tag classification model based on the sample images corresponding to each of a plurality of classification tasks.

According to still yet another aspect, a computer-readable storage medium is provided. One or more program is stored on the computer-readable storage medium, and the one or more program implements following steps of an image processing method when being executed by a processor: acquiring an image; determining a feature map of the image based on an image tag classification model, wherein the image tag classification model includes a plurality of classification tasks; and determining tags corresponding to the feature map based on the classification tasks, wherein each of the tags includes a probability value.

According to still yet another aspect, a computer-readable storage medium is provided. One or more program is stored on the computer-readable storage medium, and the one or more program implements following steps of a training method for an image tag classification model when being executed by a processor: acquiring sample images corresponding to each of a plurality of classification tasks, wherein each of the sample images has tag data, the tag data includes a classification task to which the sample image belongs and a target tag corresponding to the sample image under the classification task, and a probability value corresponding to the target tag is 1 and each of probability values corresponding to other tags is 0 in a classification result of the sample image under the classification task to which the sample image belongs; and training the image tag classification model based on the sample images corresponding to each of a plurality of classification tasks.

According to still yet further another aspect, a computer program product is provided. The computer program product, when running on a computer, enables the computer to implement following steps of an image processing method: acquiring an image; determining a feature map of the image based on an image tag classification model, wherein the image tag classification model includes a plurality of classification tasks; and determining tags corresponding to the feature map based on the classification tasks, wherein each of the tags includes a probability value.

According to still yet further another aspect, a computer program product is provided. The computer program product, when running on a computer, enables the computer to implement following steps of a training method for an image tag classification model: acquiring sample images corresponding to each of a plurality of classification tasks, wherein each of the sample images has tag data, the tag data includes a classification task to which the sample image belongs and a target tag corresponding to the sample image under the classification task, and a probability value corresponding to the target tag is 1 and each of probability values corresponding to other tags is 0 in a classification result of the sample image under the classification task to which the sample image belongs; and training the image tag classification model based on the sample images corresponding to each of a plurality of classification tasks.

BRIEF DESCRIPTION OF THE DRAWINGS

Accompanying drawings are only illustrative purposes of the one or more embodiment, and not intended to limit the present disclosure. Throughout all the accompanying drawings, same reference signs refer to same elements. Among the drawings.

DETAILED DESCRIPTION OF EMBODIMENTS

The example embodiments of the present disclosure will be described in details hereinafter with reference to the accompanying drawings. Although the example embodiments of the present disclosure are shown in the accompanying drawings, it should be understood that the present disclosure can be realized in various forms and shall not be limited to the embodiments elaborated hereinafter. On the contrary, the embodiments are provided such that the present disclosure may be understood more thoroughly and the scope of the present disclosure may be completely conveyed to a person skilled in the art.

In some embodiments, one image tag classification model is usually trained for one classification task to classify the classification task. In this way, a plurality of image tag classification models need to be trained when there is a plurality of classification tasks. The amount of the image tag classification models are large and the functions are few.

Figure 1:
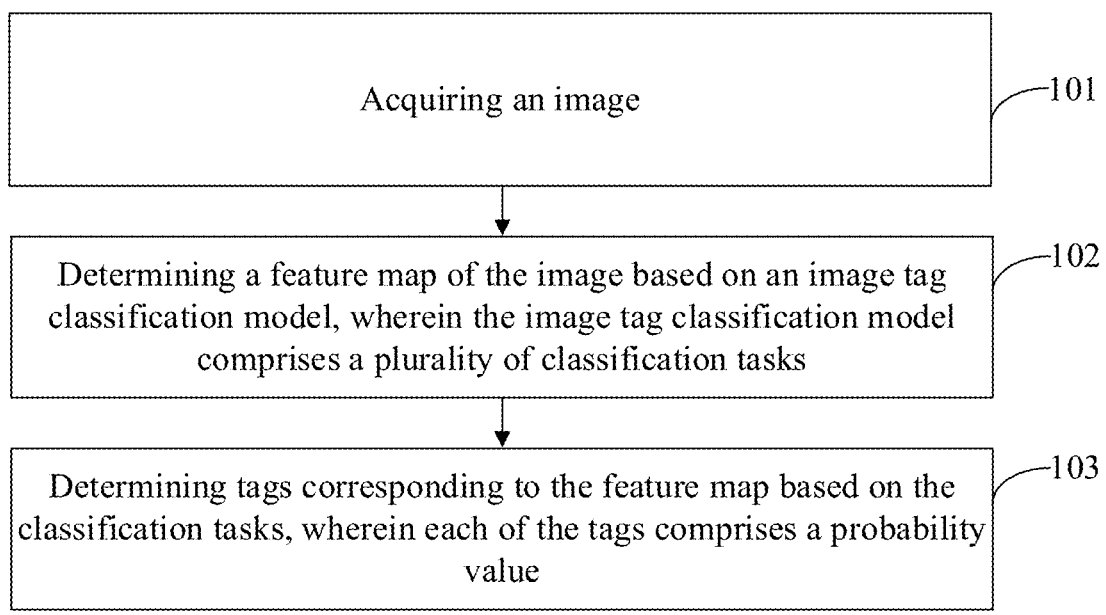
FIG. 1 is a flowchart of the steps of an image processing method according to an embodiment of the present disclosure.

Referring to FIG. 1, which shows a flowchart of steps of an image processing method according to an embodiment of the present disclosure.

In some embodiments, the image processing method is applied to an electronic apparatus, and the method includes the following steps.

In 101, an image is acquired.

In 102, a feature map of the image is determined based on an image tag classification model, wherein the image tag classification model includes a plurality of classification tasks.

In the 102, the image is input into the image tag classification model by the electronic apparatus, and each feature map of the image is acquired by the image tag classification model.

In some embodiments, the image may be a single-frame image in a video. In other embodiments, the image may be a multimedia image. The feature map may be obtained after one image is input into a convolutional neural network and passes through a convolutional layer or a pooling layer.

In some embodiments, the backbone network of the image tag classification model is a convolutional neural network. In this step, the feature map can be obtained by inputting the image into the convolutional neural network.

In some embodiments, the convolutional neural network can perform a convolution operation on an image to obtain a feature map of the image. The method of obtaining the feature map is not limited in the embodiment of the present application.

In 103, tags corresponding to the feature map are determined based on the classification tasks, wherein each of the tags includes a probability value.

In the 103, the electronic apparatus respectively classifies each feature map through the classification tasks in the image tag classification model to obtain a tag corresponding to each feature map, and each tag corresponds to a probability value.

In some embodiments, parts used for classification in the image tag classification model can be classifiers, and the amount of the classifiers is at least one. If there is one classifier, the classifier includes the classification tasks. If there is a plurality of classifiers, each classifier includes a classification task. Correspondingly, the 103 further includes inputting the feature map into the classifier, and respectively classify the feature map through each classification task in the classifier.

That is, the image tag classification model includes a convolutional neural network and at least one classifier; wherein, the convolutional neural network is used to acquire a feature map of an image.

In some embodiments, a classifier includes the classification tasks.

In other embodiments, each classifier includes one classification task.

If it is considered that each classification task corresponds to one classifier, merging the plurality of classifiers of the plurality classification tasks into one model in which the plurality of classifiers share a convolutional neural network when the image tag classification model is being trained. Certainly, the classifier corresponding to each classification task can also be regarded as a sub-classifier, and the combination of the sub-classifiers can be used as a classifier.

In some embodiments, each of the classification tasks is one of a multi-tag classification task and a single-tag classification task. After the single-tag classification task performs tag prediction on an image, the prediction result is a single tag. That is, one of the one or more tags obtained through the single-tag classification task is used as the final classification result of the feature map. After the multi-tag classification task performs tag prediction on an image, the prediction result is a plurality of tags. That is, a plurality of tags among the plurality of tags obtained through the multi-tag classification task is used as the final classification result of the feature map.

In this implementation, the image tag classification model can perform both single-tag classification tasks and multi-tag classification tasks, and flexibly perform classification steps according to the image type of the image to meet the diversified classification needs of users.

In some embodiments, the number of classification tasks included in the image tag classification model and the type of each classification task are set by those skilled in the art according to actual needs, which are not limited in the embodiments of the present application. For example: setting the number of classification tasks in the classifier to 2, 3, 4, or 5, etc.

Each classification task performs tag prediction on the feature map. In some embodiments, the probability value corresponding to the tag of each classification task can be represented in the form of a feature vector. The feature vector includes plurality of elements, and each of the elements is a probability value that the tag of the feature map is the tag of the corresponding classification task. Each element in the feature vector corresponds to a tag of the classification task. Each element is the probability value that the tag of the corresponding classification task is the tag of the feature map.

Through the above 101 to 103, after the probability value that the tag corresponding to the image is each tag of each classification task is obtained, it can be used as training sample data, or provided to relevant technical personnel to research the classification of images. Certainly, the probability value can also be applied to other scenarios, which is not limited in the embodiment of the present disclosure.

In some embodiments, the above probability value is also used to continue to select tags corresponding to the image. That is, the electronic apparatus may select the tags of the image from the plurality of tags of the classification tasks according to the probability value. Each tag of the image matches the image.

The selected tag is the tag prediction result of the image. In the tag prediction result, some classification tasks output tags that are empty, some classification tasks output a single tag, and some classification tasks output a plurality of tags, and each output tag corresponds to a probability value.

In some embodiments, when the tags of each image are selected and output according to the probability value, each classification task predicts the probability value that each tag of the classification task is the tag of the image, then the first tag whose probability value is higher than a preset probability threshold can be selected from the tags of the classification task; and the first tag is determined as the tag of the image. The amount of the first tag obtained by selecting may be one, more, or zero. In some embodiments, the preset probability threshold may be set by those skilled in the art according to actual needs. The greater the preset probability threshold is, the higher the accuracy of the obtained tag is.

For example, the classifier includes a game classification task, a real scene classification task and an object classification task, wherein the first two classification tasks are single-tag classification tasks, and the object classification task is a multi-tag classification task. If a teddy image is input into the classifier, the obtained probability value corresponding to each of the tags under the game classification task is 0 after the classifier carries out tag identification on the image, and an output result of the classification task is empty; the probability value corresponding to each of the tags under the real scene classification task is also 0, and an output result of the classification task is also empty; and probability values of three tags of "animal", "dog" and "teddy" are not 0, probability values of other tags under the object classification object are 0, and tags output by the classification task are "animal", "dog" and "teddy". At last, a tag of the image is selected, on the basis of the probability value, from the output tags. In some embodiments, during selecting, the probability threshold is preset, and only tags with the probability value higher than the preset probability threshold are selected as the tag of the image.

Similarly, if a game image is input, the obtained probability value of a certain tag under the game classification task is not 0 after the classifier carries out tag identification on the image, probability values of other tags under the classification task are 0, and the classification task outputs a tag; the probability value corresponding to each of the tags under the real scene classification task is 0, and the tag output by the classification task is empty; and the probability value corresponding to each of the tags under the object classification task is also 0, the tag output by the classification task is also empty.

Figure 2:
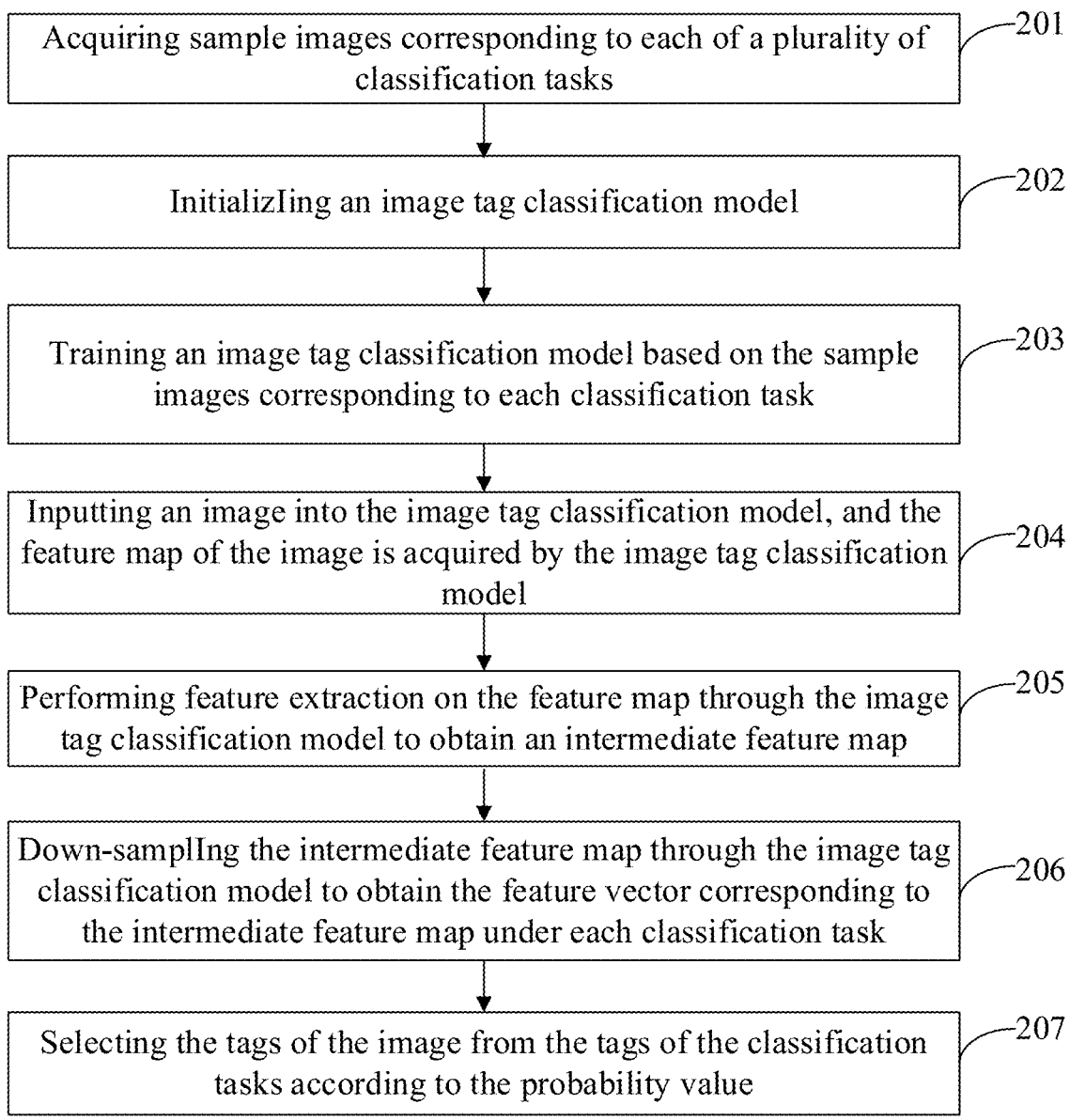
FIG. 2 is a flowchart of the steps of an image processing method according to an embodiment of the present disclosure.

Referring to FIG. 2, which shows a flowchart of the steps of an image processing method according to an embodiment of the present disclosure. In the present embodiment, the process of training method for the image tag classification model is described through 201 to 203, and the process of image processing method is described through 204 to 207.

In some embodiments, the image processing method according to the embodiment of the present disclosure is applied to an electronic apparatus, and the method includes the following steps.

In 201, sample images corresponding to each of a plurality of classification tasks are acquired.

Wherein, each of the sample images has tag data, the tag data includes a classification task to which the sample image belongs and at least one target tag corresponding to the sample image under the classification task to which the sample image belongs. In a classification result of the sample image under the classification task to which the sample image belongs, a probability value corresponding to each of the at least one target tag is 1, and each of probability values corresponding to other tags is 0.

In the 201, the electronic apparatus may construct sample images for each classification task. During constructing the sample images corresponding to each of the classification tasks, the sample images under each of the classification tasks are acquired, and each sample image is tagged. In an implementation, during tagging the sample images, for each sample image, the classification task, to which the sample image belongs, and the target tags corresponding to the sample image under the classification task are determined. The probability value at the position of each target tag is set to 1, and probability value at the position of each of tags other than the target tags is set to 0, wherein each of the classification tasks includes a plurality of tags, and each tag corresponds to a position in a classification result of a classification task to which the tag belongs.

In some embodiments, the classification result is in the form of a feature vector. The feature vector includes a plurality of elements, each of the elements corresponds to a tag, and includes a probability value corresponding to the tag, and the probability value is used to indicate the probability that the tag is the tag of the sample image.

The constructed sample image not only includes sample image itself, but also includes the probability value of the sample image at each of the tag positions under each of the classification tasks.

In 202, an image tag classification model is initialized.

To initialize the image tag classification model is to create each classification task under the classifier as needed. It should be noted that the 202 is an optional step, and the model may be initialized, or, the model may not be initialized, and the subsequent training steps may be directly performed on the model.

In some embodiments, the classification tasks are single-tag tasks. In other embodiments, the classification tasks are multi-tag tasks.

Under a single-tag classification task, if a certain image belongs to the classification task, there is only one tag has a probability value of 1 at the corresponding position, and the probability value at the position corresponding to each of the other tags is 0. Under a multi-tag classification task, if a certain image belongs to the classification task, there may be a probability value of 1 at the position corresponding to each of a plurality of tags, and a probability value of 0 at the position corresponding to the other tags. In a single-tag classification task or a multi-tag classification task, a certain image may not belong to any classification task, and the probability values of the image at the positions corresponding all tags under the classification task are all 0.

In 203, an image tag classification model is trained based on the sample images corresponding to each classification task.

After the image tag classification model is constructed, the image tag classification model needs to be trained until target conditions are met, and the image tag prediction can be performed. The image tag prediction process is also the image processing process.

In some embodiments, the image tag classification model includes a convolutional neural network and at least one classifier. A classifier can perform image tag prediction after the classifier converges to a preset standard. In the embodiment of the present disclosure, the convolutional neural network is used as the backbone network for training the image tag classification model. In the training process, the feature map of the sample image can be acquired by the convolutional neural network of the image tag classification model, and then the feature map is input to the classifier for classification, and subsequent training steps are performed.

In some embodiments, the training process of the image tag classification model is implemented through the following steps one to four.

In step one, a feature map of each of the sample images is determined based on the image tag classification model, wherein each of the sample images corresponds to at least one target tag and a probability value corresponding to each of the at least one target tag.

In step two, tags corresponding to each of the sample images are determined through the classification tasks in the image tag classification model, wherein each of the tags corresponds to a probability value.

In step three, a prediction accuracy about each of the sample images is acquired based on the tags corresponding to each of the sample images, the probability value corresponding to each of the tags, the at least one target tag corresponding to each of the sample images and the probability value corresponding to each of the at least one target tag; wherein each of the classification tasks corresponds to a prediction accuracy, and the prediction accuracy about each of the sample images is determined based on prediction accuracies obtained by each of the sample image under the classification tasks.

In step four, model parameters of the image tag classification model are updated according to the prediction accuracy.

In some embodiments, the acquisition process of the feature map in the step one is implemented through the process of determining feature maps, feature extraction and down-sampling. The process include: The electronic apparatus can input the sample image into the image tag classification model, determine the first feature map of the sample image, perform feature extraction on the first feature map through the image tag classification model to obtain at least one intermediate feature map, and perform down-sampling to obtain the first feature vector corresponding to the second feature map.

In some embodiments, the step of feature extraction is a dimension reducing processing step. That is, the electronic apparatus performs dimension reducing processing on the first feature map through the image tag classification model to obtain at least one intermediate feature map.

In some embodiments, the down-sampling process is implemented through a pooling step, and the pooling step includes a plurality of possible implementations. In some embodiments, the electronic apparatus performs average pooling processing on the second feature map to obtain the first feature vector corresponding to the second feature map.

In an implementation in which the image tag classification model includes a convolutional neural network and at least one classifier, acquiring the feature map is implemented by the convolutional neural network, and the feature extraction and down-sampling are implemented by the classifier.

In some embodiments, when the model parameters of the image tag classification model are updated according to the prediction accuracy, gradient values can be obtained, and the model parameters of the image tag classification model can be updated based on the gradient values.

The following provides an example for the above-mentioned optional implementations. In the example, the training process of the classifier includes the following sub-steps.

In sub-step one, the sample image is input into the convolutional neural network to determine the first feature map of the sample image.

In sub-step two, the first feature map is input into the classifier for dimension reducing processing to obtain the second feature map.

In sub-step two, average pooling is applied to the second feature map to obtain the first feature vector corresponding to the second feature map.

The first feature vector includes a plurality of elements, each of the elements corresponds to a tag in one classifier, each element is a probability value. The classifier includes a plurality of classification tasks, each of the classification tasks includes a plurality of tags, such that the classifier includes a plurality of tags, and the probability value indicates the matching degree between the image and the tag.

In sub-step four, a value of a target loss function of the classifier is calculated to obtain a gradient value from a partial derivative of each of the elements in the first feature vector.

Each of the classification tasks included in the classifier corresponds to a loss function, and a weighted sum of the values of the loss functions is the value of a target loss function. For example, the classifier includes three classification tasks A, B and C, the value of a loss function corresponding to the A is loss1, the value of a loss function corresponding to the B is loss2, the value of a loss function corresponding to the C is loss3, a weight of the A is X1, a weight of the B is X2, a weight of the C is X3, and the value of the target loss function is as follows:

$$loss\_t = X1 \times loss1 + X2 \times loss2 + X3 \times loss3$$

In sub-step five, model parameters of the image tag classification model are updated based on the gradient value.

The training of the image tag classification model is actually constant updating of the model parameters, and the image tag prediction can be carried out after the model parameters converging to a preset standard. The backbone network of the image tag classification model is used for feature extraction, and the model training process is more about training the classifier. The training of the classifier is actually constant updating of the model parameter until the classifier converges to a preset standard to carry out image tag prediction. Certainly, the model parameters of the convolutional neural network is also updated, which will not be repeated here. In some embodiments, a process how to judge the classifier converges to the preset standard is shown in sub-step six to sub-step eight.

In sub-step six, a loss value corresponding to each of the elements in the first vector is calculated based on the target loss function.

In sub-step seven, a mean value of loss values corresponding to the elements is calculated to obtain an average loss value.

In sub-step eight, whether the average loss value is smaller than a preset loss value or not is judged; if yes, training of the classifier is ended; and if not, the sub-step one is returned to be executed, a sample image is continued to be input into a convolutional neural network, and the classifier is trained until the average loss value is smaller than the preset loss value.

If the average loss value is smaller than the preset loss value, it may be confirmed that the classifier converges to the preset standard. In some embodiments, the preset loss value is set by those skilled in the art according to actual needs, which is not limited in the embodiment of the present disclosure. The smaller the preset loss value is, the better the convergence of the classifier, after training is completed, is; and the greater the preset loss value is, the easier the training of the classifier is.

In 204, an image is input into the image tag classification model, and the feature map of the image is acquired by the image tag classification model.

The 204 is the process of determining the feature map of the image through the image tag classification model. The process of determining the feature map is the feature extraction step, wherein the features of the image is reflected in the form of feature maps.

The 201 to the 203 are steps of training an image tag classification model. In the implementation process, the 201 to the 203 need not to be executed if the image tag classification model is trained, and image tag prediction may be directly executed by the trained image tag classification model. In some embodiments, a prediction process is shown in 204 to 207.

The image tag classification model includes a plurality of classification tasks.

In some embodiments, the convolutional neural network is the backbone network of the image tag classification model. The image tag classification model includes at least one classifier. One classifier includes a plurality of classification tasks, or, each of a plurality of classifiers includes one classification task. In some embodiments, each classification task is a multi-tag classification task or a single-tag classification task. In the embodiment, the image is input into the convolutional neural network, the feature map of the image is acquired, the feature map is input into the classifier, and the subsequent steps 205 and 206 are executed by the classifier.

In 205, feature extraction is performed on the feature map through the image tag classification model to obtain an intermediate feature map.

This feature extraction step is a dimension reducing process. Therefore, in the 205, the feature map can be subjected to dimension reducing processing through the image tag classification model to obtain an intermediate feature map.

The 205 is a process of determining an intermediate feature map of the feature map through the image tag classification model, and the process of determining the intermediate feature map is a feature extraction step.

In 206, the intermediate feature map is down-sampled through the image tag classification model to obtain the feature vector corresponding to the intermediate feature map under each classification task.

The down-sampling process can be realized by a pooling step, and the pooling step can adopt an average pooling method. Accordingly, in the 206, the intermediate feature maps are averagely pooled through the image tag classification model to obtain the corresponding feature vector of the intermediate feature map under each classification task.

The feature vector under each classification task includes a plurality of elements, and each element corresponds to a tag and a probability value in the classification task. Each element is the probability value that the tag of the feature map is the tag in the corresponding classification task. The tag corresponding to the non-zero probability value in the feature vector can be used as the predicted tag.

Steps 205 and 206 are the processing of classifying feature maps respectively through the classification tasks in the image tag classification model to obtain tags corresponding to the feature maps, and each tag corresponds to a probability value.

In 207, the tags of the image are selected from the tags of the classification tasks according to the probability value.

In some embodiments, said selecting image tags includes: selecting the first tags with a probability value higher than a preset probability threshold from the tags of the classification tasks, and determining the first tags as the tags of the image.

It should be noted that the 207 is an optional step. In some application scenarios, the 207 can be executed when the tags of the image needs to be obtained. In other application scenarios, when the probability value obtained by image prediction needs to be used, the 207 does not need to be performed.

Figure 3:
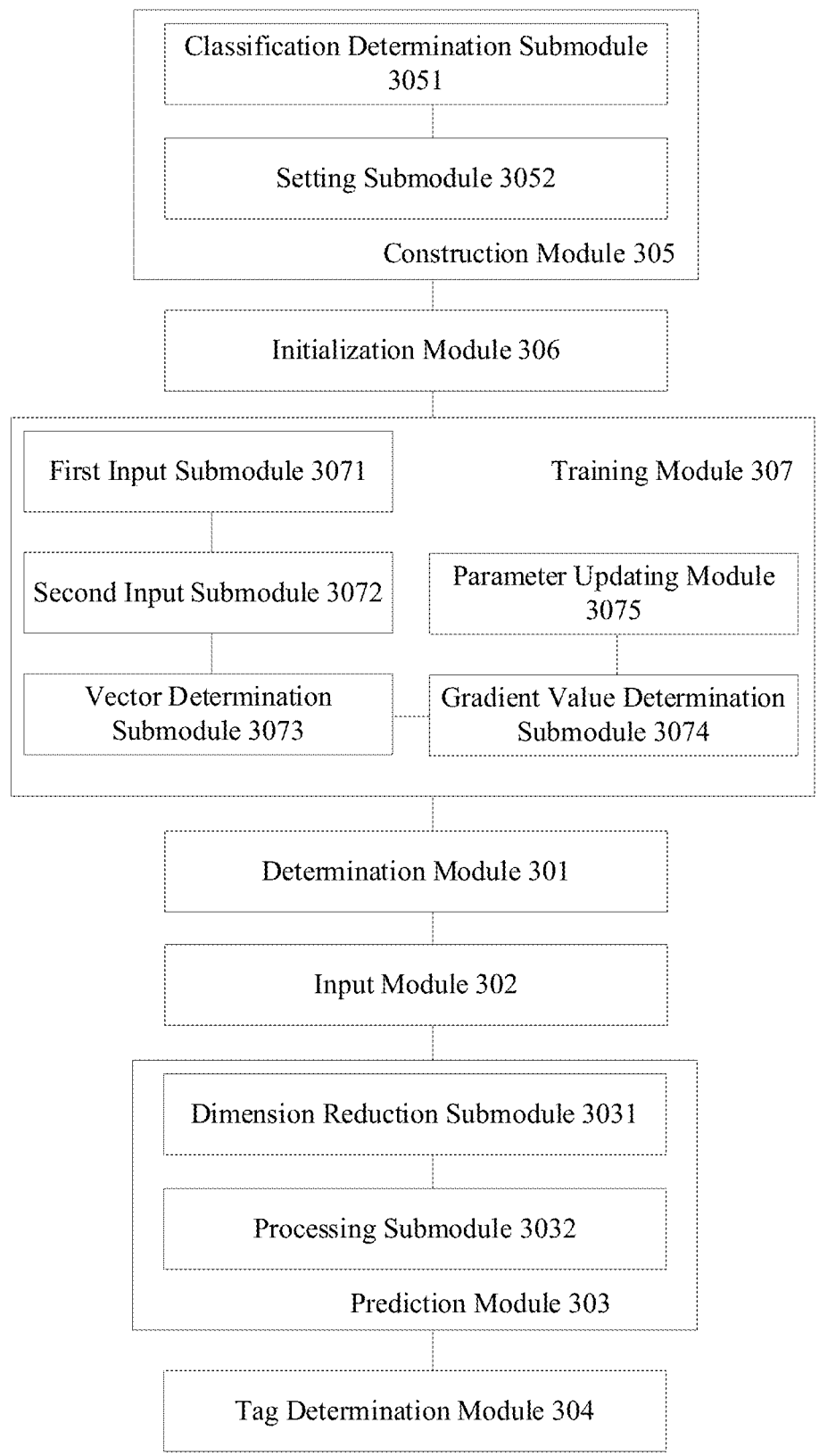
FIG. 3 is a block diagram of the structure of an image processing device according to an embodiment of the present disclosure.

Referring to FIG. 3, which shows a block diagram of the structure of an image processing device according to an embodiment of the present disclosure.

The image processing device according to the embodiment of the preset disclosure includes: an acquisition module configured to acquire an image; a determination module 301 configured to determine a feature map of the image based on an image tag classification model, wherein the image tag classification model includes a plurality of classification tasks; and a prediction module 303 configured to determine tags corresponding to the feature map based on the classification tasks, wherein each of the tags includes a probability value.

In some embodiments, the determination module 301 is further configured to determine an intermediate feature map of the feature map based on the image tag classification model, and determine a feature vector, which corresponds to the classification tasks, of the intermediate feature map based on the image tag classification model; wherein the feature vector includes a plurality of elements, each of the elements includes a probability value that a tag of the feature map is a tag of a corresponding classification task.

In some embodiments, the image tag classification model includes a convolutional neural network and a classifier; wherein the convolutional neural network is used to acquire the feature map of the image, and the classifier includes the classification tasks.

In some embodiments, the image tag classification model includes a convolutional neural network and a plurality of classifiers; wherein the convolutional neural network is used to acquire the feature map of the image, and each of the plurality of classifiers includes one classification task.

In some embodiments, the determination module 301 is further configured to input the image into the convolutional neural network to determine the feature map of the image; and the device further include an input module 302 configured to input the feature map into a classifier, wherein the classifier includes the classification tasks.

In some embodiments, each of the classification tasks is one of a multi-tag classification task and a single-tag classification task.

In some embodiments, the device further include a tag determination module 304 configured to select tags of the image from tags of the classification tasks according to the probability value of each of the tags.

In some embodiments, the tag determination module 304 is further configured to select the first tags of which probability values are greater than a probability threshold as the tags of the image from the tags of the classification tasks.

In some embodiments, the prediction module 303 includes: a dimension reduction submodule 3031, configured to perform feature extraction on the feature map through the image tag classification model to obtain an intermediate feature map; a processing submodule 3032, configured to perform down-sampling on the intermediate feature map through the image tag classification model to obtain a feature vector corresponding to the intermediate feature map under each classification task; wherein the feature vector under each classification task includes a plurality of elements, and each element is the probability value that the tag of the corresponding classification task is the tag of the feature map In some embodiments, the dimension reduction submodule 3031 is further configured to perform dimension reducing processing on the feature map through the image tag classification model to obtain an intermediate feature map; and the processing submodule 3032 is further configured to averagely pool the intermediate feature maps through the image tag classification model to obtain the feature vector corresponding to the intermediate feature map under each classification task.

In some embodiments, the device further includes: a construction module 305 configured to acquire a plurality of sample images corresponding to each classification task, wherein each of the sample images has tag data, the tag data includes a classification task to which the sample image belongs and at least one target tag corresponding to the sample image under the classification task to which the sample image belongs, and a probability value corresponding to each of the at least one target tag is 1 and each of probability values corresponding to other tags is 0 in a classification result of the sample image under the classification task to which the sample image belongs; and a training module 307 configured to train the image tag classification model based on the sample images corresponding to each classification task.

In some embodiments, the device further includes: an initialization module 306 configured to initialize the image tag classification model.

In some embodiments, the construction module 305 includes: a classification determination submodule 3051 configured to, for each sample image, determine the classification task to which the sample image belongs and the at least one target tag corresponding to the sample image under the classification task to which the sample image belongs; a setting submodule 3052 configured to set a probability value at a position of each of the at least one target tag to 1 in a classification result of the sample image under the classification task to which the sample image belongs, and set a probability value at a position of each of tags other than the at least one target tag to 0 in a classification result of the sample image under each of the classification tasks, wherein each tag corresponds to a position in a classification result of a classification task to which the tag belongs.

In some embodiments, the training module 307 is further configured to: determine a feature map of each of the sample images based on the image tag classification model, wherein each of the sample images corresponds to the at least one target tag and a probability value corresponding to each of the at least one target tag; determine tags corresponding to each of the sample images through the classification tasks in the image tag classification model, wherein each of the tags corresponds to a probability value; acquire a prediction accuracy about each of the sample images based on the tags corresponding to each of the sample images, the probability value corresponding to each of the tags, the at least one target tag corresponding to each of the sample images and the probability value corresponding to each of the at least one target tag; wherein each of the classification tasks corresponds to a prediction accuracy, and the prediction accuracy about each of the sample images is determined based on prediction accuracies obtained by each of the sample image under the classification tasks; and update model parameters of the image tag classification model according to the prediction accuracy.

In some embodiments, the training module 307 includes: a first input submodule 3071 configured to input each sample image into a convolutional neural network to acquire a first feature map of the sample image; a second input submodule 3072 configured to input the first feature map into the classifier for dimensionality reduction to obtain a second feature map; a vector determination submodule 3073 configured to apply average pooling on the second feature map to obtain a first feature vector corresponding to the second feature map, the first feature vector including a plurality of elements, and each element is the probability value that the tag of the feature map is the tag in the corresponding classification task; a gradient value determination submodule 3074 configured to calculate a value of a target loss function of the classifier to obtain a gradient value from a partial derivative of each of the points in the first feature vector, each of the classification tasks included in the classifier corresponding to a loss function, a weighted sum of the values of loss functions being the value of target loss function; and a parameter updating module 3075 configured to update, based on the gradient value, a model parameter corresponding to the classifier.

Figure 4:
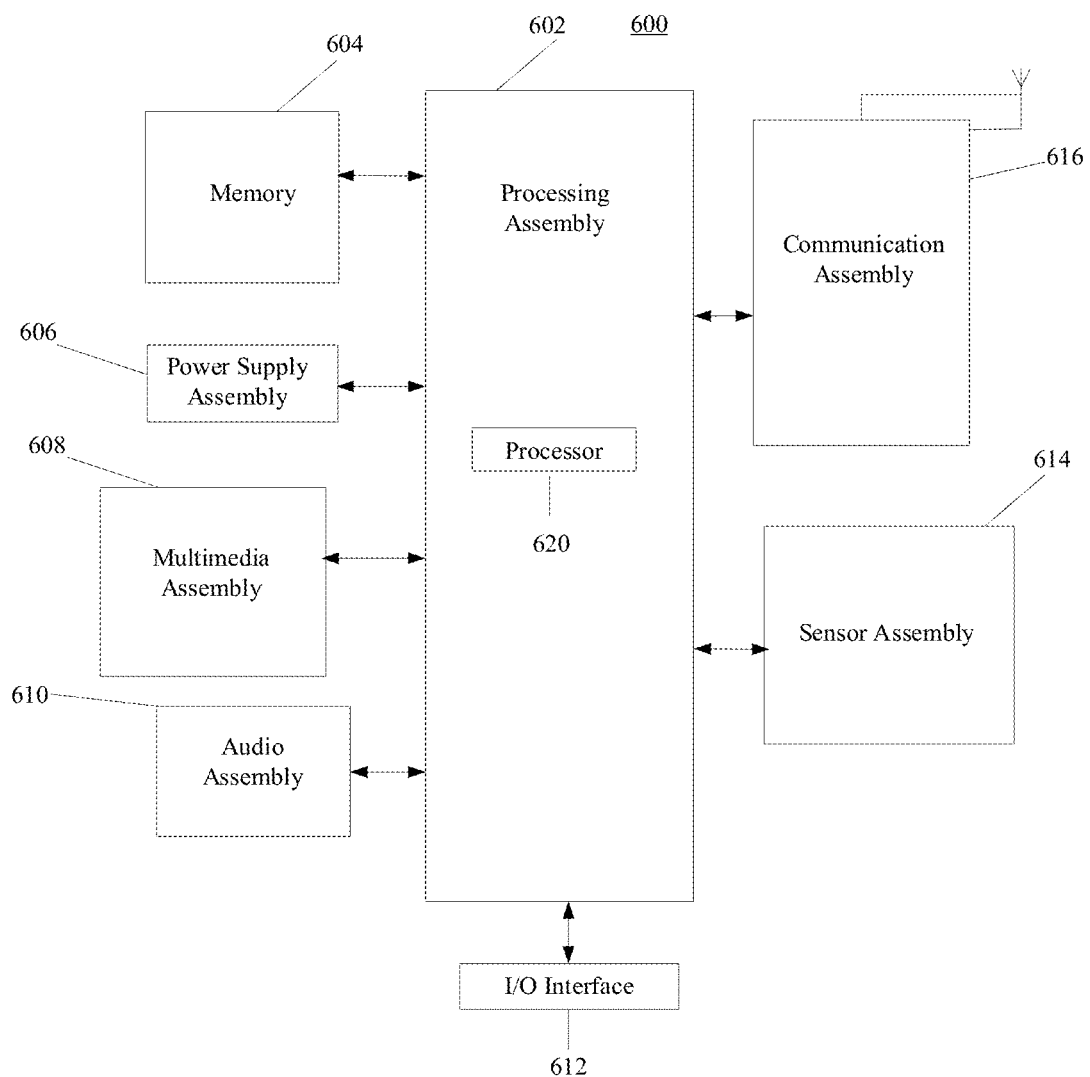
FIG. 4 is a block diagram of the structure of a terminal according to an embodiment of the present disclosure.

In some embodiments, the electronic apparatus is a terminal, and in some embodiments, the electronic apparatus is a server. Referring to FIG. 4, which shows a block diagram of the structure of a terminal for image processing or image tag classification training according to an embodiment of the disclosure.

In some embodiments, the terminal includes at least one memory, at least one processor and one or more program stored in the at least one memory, wherein the one or more program is capable of being executed by the at least one processor, and the one or more program implements the following steps when being executed by the at least one processor: acquiring an image; determining a feature map of the image based on an image tag classification model, wherein the image tag classification model includes a plurality of classification tasks; and determining tags corresponding to the feature map based on the classification tasks, wherein each of the tags includes a probability value.

In some embodiments, said determining tags corresponding to the feature map based on the classification tasks includes: determining an intermediate feature map of the feature map based on the image tag classification model; and determining a feature vector, which corresponds to the classification tasks, of the intermediate feature map based on the image tag classification model; wherein the feature vector includes a plurality of elements, each of the elements includes a probability value that a tag of the feature map is a tag of a corresponding classification task.

In some embodiments, each of the classification tasks is one of a multi-tag classification task and a single-tag classification task.

In some embodiments, the one or more program further implements a following step when being executed by the at least one processor: selecting tags of the image from tags of the classification tasks according to the probability value of each of the tags.

In some embodiments, said selecting tags of the image from tags of the classification tasks according to probability values includes: determining first tags, wherein each probability value of the first tags is greater than a probability threshold; and determining the tags of the image from the tags of the classification tasks based on the first tags.

In some embodiments, the image tag classification model includes a convolutional neural network and a classifier; wherein the convolutional neural network is used to acquire the feature map of the image, and the classifier includes the classification tasks.

In some embodiments, the image tag classification model includes a convolutional neural network and a plurality of classifiers; wherein the convolutional neural network is used to acquire the feature map of the image, and each of the plurality of classifiers includes one classification task.

The electronic apparatus according to the embodiment of the present disclosure includes: at least one memory, at least one processor and one or more program stored in the at least one memory, wherein the one or more program is capable of being executed by the at least one processor, and the one or more program implements the following steps when being executed by the at least one processor: acquiring an image; determining a feature map of the image based on an image tag classification model, wherein the image tag classification model includes a plurality of classification tasks; and determining tags corresponding to the feature map based on the classification tasks, wherein each of the tags includes a probability value.

In some embodiments, the terminal may include: at least one memory, at least one processor and one or more program stored in the at least one memory, wherein the one or more program is capable of being executed by the at least one processor, and the one or more program implements the following steps when being executed by the at least one processor: acquiring sample images corresponding to each of a plurality of classification tasks, wherein each of the sample images has tag data, the tag data includes a classification task to which the sample image belongs and at least one target tag corresponding to the sample image under the classification task to which the sample image belongs, and a probability value corresponding to each of the at least one target tag is 1 and each of probability values corresponding to other tags is 0 in a classification result of the sample image under the classification task to which the sample image belongs; and training the image tag classification model based on the sample images corresponding to each of a plurality of classification tasks.

In some embodiments, said acquiring sample images corresponding to each of a plurality of classification tasks includes: for each sample image, determining the classification task to which the sample image belongs and the at least one target tag corresponding to the sample image under the classification task to which the sample image belongs; setting a probability value at a position of each of the at least one target tag to 1 in a classification result of the sample image under the classification task to which the sample image belongs; and setting a probability value at a position of each of tags other than the at least one target tag to 0 in a classification result of the sample image under each of the classification tasks, wherein each tag corresponds to a position in a classification result of a classification task to which the tag belongs.

In some embodiments, said training the image tag classification model based on the sample images corresponding to each of a plurality of classification tasks includes: determining a feature map of each of the sample images based on the image tag classification model, wherein each of the sample images corresponds to the at least one target tag and a probability value corresponding to each of the at least one target tag; determining tags corresponding to each of the sample images through the classification tasks in the image tag classification model, wherein each of the tags corresponds to a probability value; acquiring a prediction accuracy about each of the sample images based on the tags corresponding to each of the sample images, the probability value corresponding to each of the tags, the at least one target tag corresponding to each of the sample images and the probability value corresponding to each of the at least one target tag; wherein each of the classification tasks corresponds to a prediction accuracy, and the prediction accuracy about each of the sample images is determined based on prediction accuracies obtained by each of the sample image under the classification tasks; and updating model parameters of the image tag classification model according to the prediction accuracy.

In some embodiments, the terminal 600 is one of a mobile phone, a computer, a digital broadcasting terminal, a message transceiver, a game console, a tablet device, medical facility, fitness equipment, personal digital assistant and the like.

Referring to FIG. 4, the terminal 600 includes one or more of the following assemblies: a processing assembly 602, a memory 604, a power supply assembly 606, a multimedia assembly 608, an audio assembly 610, an input/output (I/O) interface 612, a sensor assembly 614 and a communication assembly 616.

The processing assembly 602 generally controls the overall operations of the device 600, such as the operations associated with display, phone calling, data communication, camera operation and recording operation. In some embodiments, the processing assembly 602 includes one or more processors 620 to execute instructions to complete the whole or a part of the steps of the method. In addition, the processing assembly 602 may include one or more modules which facilitate the interaction between the processing assembly 602 and other assemblies. For example, the processing assembly 602 includes a multimedia module to facilitate the interaction between the multimedia assembly 608 and the processing assembly 602.

The memory 604 is configured to store various types of data to support operation on the terminal 600. Examples of such types of data include instructions, contact data, telephone directory data, messages, photos, videos and the like of any disclosure program or method operated on the terminal 600. The memory 604 is any types of volatile or non-volatile storage devices, or a combination thereof, such as a static random access memory (SRAM), an electrically-erasable programmable read-only memory (EEPROM), an erasable programmable read-only memory (EPROM), a programmable read-only memory (PROM), a read-only memory (ROM), a magnetic memory, a flash memory, a magnetic disk or a compact disk.

The power supply assembly 606 provides power for various assemblies of the terminal 600. In some embodiments, the power supply assembly 606 includes a power supply management system, one or more power supplies, and other assemblies associated with terminal generation, management and power distribution for the terminal 600.

The multimedia assembly 608 includes a screen between the terminal 600 and a user and capable of providing an output interface. In some embodiments, the screen includes a liquid crystal display (LCD) and a touch panel (TP). If the screen includes the touch panel, then the screen is realized as a touch screen to receive an input signal from the user. The touch panel includes one or more touch sensors to sense a touch, a slide and a gesture on the touch panel. The touch sensor can not only sense a boundary of a touch or slide action, but also detect a duration and a pressure related to the touch or slide operation. In some embodiments, the multimedia assembly 608 includes a front camera and/or a rear camera. When the terminal 600 is in an operation mode, such as a shooting mode or a video mode, the front camera and/or rear camera can receive external multimedia data. Each one of the front camera and the rear camera is a fixed optical lens system or has a focal length and an optical zoom capability.

The audio assembly 610 is configured to output and/or input an audio signal. For example, the audio assembly 610 includes a microphone (MIC). When the terminal 600 is in an operating mode, such as a calling mode, a recording mode or a voice recognition mode, the microphone is configured to receive an external audio signal. The received audio signal is further stored in the memory 604, or transmitted via the communication assembly 616. In some embodiments, the audio assembly 610 further includes a loudspeaker for outputting the audio signal.

The I/O interface 612 is an interface provided between the processing assembly 602 and a peripheral interface module, wherein the peripheral interface module is one of a keyboard, a click wheel, a button and the like. The button may include but not limited to a homepage button, a volume button, an activation button and a lock button.

The sensor assembly 614 includes one or more sensors for providing state evaluation of each aspect for the terminal 600. For example, the sensor assembly 614 can detect an on/off state of the terminal 600 and relative positioning of the assemblies, for example, the assemblies are a display and a small keyboard of the terminal 600; and the sensor assembly 614 can also detect position change of the terminal 600 or one assembly of the terminal 600, contact or non-contact of the user and the terminal 600, azimuth or acceleration/deceleration of the terminal 600, and temperature change of the terminal 600. In some embodiments, the sensor assembly 614 includes a proximity sensor configured to detect whether an object exists nearby when no physical contact is detected. The sensor assembly 614 may further include a light sensor, such as a CMOS or a CCD image sensor, for use in an imaging disclosure. In some embodiments, the sensor assembly 614 further includes an acceleration sensor, a gyroscope sensor, a magnetic sensor, a pressure sensor or a temperature sensor.

The communication assembly 616 is configured to facilitate wire or wireless communication between the terminal 600 and other devices. The terminal 600 can be accessed to a wireless network, such as WiFi, 2G or 3G or a combination thereof, on the basis of a communication standard. In an example embodiment, the communication assembly 616 receives, on the basis of a broadcasting channel, a broadcasting signal or broadcasting related information from an external broadcasting management system. In an example embodiment, the communication assembly 616 further includes a near-field communication (NFC) module to facilitate short range communication. For example, the NFC module may be realized on the basis of a radio frequency identification (RFID) technology, an infrared data association (IrDA) technology, an ultrawide band (UWB) technology, a Bluetooth (BT) technology and other technologies.

In the example embodiment, the terminal 600 is realized on the basis of one or more disclosure specific integrated circuits (ASIC), a digital signal processor (DSP), a digital signal processing device (DSPD), a programmable logic device (PLD), a field programmable gate array (FPGA), a controller, a microcontroller, a microprocessor or other electronic components, and is configured for executing the image processing method or the training method for the image tag classification model.

In the example embodiment, a non-temporary computer-readable storage medium including an instruction is further provided, such as a memory 604 including an instruction, and a processor 620 of a terminal 600 may execute the instruction to complete the image processing method or the training method for the image tag classification model. For example, the non-temporary computer-readable storage medium is one of a ROM, a random access memory (RAM), a CD-ROM, a magnetic tape, a floppy disk, an optical data storage device and the like. When the instruction in the storage medium is executed by the processor of the terminal, the terminal may execute steps of any one of the image processing methods and the training methods for the image tag classification model in the present disclosure.

Corresponding to the foregoing method embodiments, the embodiments of the present disclosure provide a computer-readable storage medium having one or more programs stored thereon.

In some embodiments, the one or more program implements the following steps when being executed by at least one processor: acquiring an image; determining a feature map of the image based on an image tag classification model, wherein the image tag classification model includes a plurality of classification tasks; and determining tags corresponding to the feature map based on the classification tasks, wherein each of the tags includes a probability value.

In some embodiments, said determining tags corresponding to the feature map based on the classification tasks includes: determining an intermediate feature map of the feature map based on the image tag classification model; and determining a feature vector, which corresponds to the classification tasks, of the intermediate feature map based on the image tag classification model; wherein the feature vector includes a plurality of elements, each of the elements includes a probability value that a tag of the feature map is a tag of a corresponding classification task.

In some embodiments, each of the classification tasks is one of a multi-tag classification task and a single-tag classification task.

In some embodiments, the one or more program further implements a following step when being executed by the at least one processor: selecting tags of the image from tags of the classification tasks according to the probability value of each of the tags.

In some embodiments, said selecting tags of the image from tags of the classification tasks according to probability values includes: determining first tags, wherein each probability value of the first tags is greater than a probability threshold; and determining the tags of the image from the tags of the classification tasks based on the first tags.

In some embodiments, the image tag classification model includes a convolutional neural network and a classifier; wherein the convolutional neural network is used to acquire the feature map of the image, and the classifier includes the classification tasks.

In some embodiments, the image tag classification model includes a convolutional neural network and a plurality of classifiers; wherein the convolutional neural network is used to acquire the feature map of the image, and each of the plurality of classifiers includes one classification task.

In some embodiments, the one or more program implements the following steps when being executed by at least one processor: acquiring sample images corresponding to each of a plurality of classification tasks, wherein each of the sample images has tag data, the tag data includes a classification task to which the sample image belongs and at least one target tag corresponding to the sample image under the classification task to which the sample image belongs, and a probability value corresponding to each of the at least one target tag is 1 and each of probability values corresponding to other tags is 0 in a classification result of the sample image under the classification task to which the sample image belongs; and training the image tag classification model based on the sample images corresponding to each of a plurality of classification tasks.

In some embodiments, said acquiring sample images corresponding to each of a plurality of classification tasks includes: for each sample image, determining the classification task to which the sample image belongs and the at least one target tag corresponding to the sample image under the classification task to which the sample image belongs; setting a probability value at a position of each of the at least one target tag to 1 in a classification result of the sample image under the classification task to which the sample image belongs; and setting a probability value at a position of each of tags other than the at least one target tag to 0 in a classification result of the sample image under each of the classification tasks, wherein each tag corresponds to a position in a classification result of a classification task to which the tag belongs.

In some embodiments, said training the image tag classification model based on the sample images corresponding to each of a plurality of classification tasks includes: determining a feature map of each of the sample images based on the image tag classification model, wherein each of the sample images corresponds to the at least one target tag and a probability value corresponding to each of the at least one target tag; determining tags corresponding to each of the sample images through the classification tasks in the image tag classification model, wherein each of the tags corresponds to a probability value; acquiring a prediction accuracy about each of the sample images based on the tags corresponding to each of the sample images, the probability value corresponding to each of the tags, the at least one target tag corresponding to each of the sample images and the probability value corresponding to each of the at least one target tag; wherein each of the classification tasks corresponds to a prediction accuracy, and the prediction accuracy about each of the sample images is determined based on prediction accuracies obtained by each of the sample image under the classification tasks; and updating model parameters of the image tag classification model according to the prediction accuracy.

Corresponding to the foregoing method embodiments, the embodiments of the present disclosure provide a computer program product, which causes the computer to execute any one of the image processing methods and the training methods for the image tag classification model in the present disclosure when running on a computer.

The image tag determination solution provided herein is not inherently correlated to any particular computer, virtual system or other equipment. In some embodiments, various universal systems are used with teachings based on the description herein. It is more apparent to construct a structure required by a system according to a solution of the present disclosure on the basis of the above descriptions. In addition, the present disclosure is also not aimed at any particular programming language. It should be understood that various programming languages can be adopted to implement the content of the present disclosure described herein, and the above descriptions of the particular language is intended to disclose one or more example embodiments.

Numerous details are described in the specification provided herein. However, it should be understood that the embodiments of the present disclosure can be practiced without these details. In some examples, well known methods, structures and technologies have not been described in detail as not to obscure understanding of the description.

Similarly, it should be understood, in the above descriptions of the example embodiments of the present disclosure, various features of the present disclosure sometimes are grouped to a single embodiment or figure or its description in order to simplify the present disclosure and help understand one or more of various aspects of the present disclosure. However, the method of the present disclosure shall not be interpreted as reflecting an intention that the claimed embodiments require more features than are expressly recited in each claim. More precisely, as reflected in the claims, inventive aspects lie in all features of any single above disclosed embodiment. Therefore, the claims following the detailed descriptions are hereby explicitly incorporated into the detailed descriptions, and each claim itself serves as a separated embodiment of the present disclosure.

Those skilled in the art may understand that the modules in the device in the embodiment can be adaptively changed and set in one or more devices different from the present embodiment. The modules or units or components in the embodiments can be combined into one module or unit or assembly, and furthermore, these can be divided into multiple submodules or subunits or sub-assemblies. Except that at least some of such features and/or processes or units are mutually exclusive, all features disclosed in this specification (including the accompanying claims, abstract, and drawings) and all processes or units of any method or device so disclosed can be combined in any combination. Each feature disclosed in this specification (including the accompanying claims, abstract, and drawings) can be replaced by alternative features serving the same, equivalent or similar purpose, unless expressly stated otherwise.

In addition, while some embodiments described herein include some but not other features included in other embodiments, combinations of features of different embodiments are meant to be within the scope of the present disclosure, and form different embodiments, as would be understood by those skilled in the art. For example, in the claims, any one of the claimed embodiments can be implemented in any combination.

Embodiments of various elements of the present disclosure can be implemented by hardware, or software modules running in one or more processors or a combination thereof. Those skilled in the art shall understand that a microprocessor or a digital signal processor (DSP) can be used in practice to implement some or all functions of some or all elements in the image processing method according to an embodiment of the present disclosure. In some embodiments, equipment or device programs (such as a computer program or a computer program product) for executing a part or all of the methods described herein also can be implemented in the present disclosure. Such program for implementing the present disclosure can be stored in a computer-readable medium or can be in a form having one or more signals. Such signals can be downloaded from Internet sites, or provided on carrier signals, or provided by any other forms.

It should be noted that the above embodiments are for illustrative purposes of the present disclosure, and are not intended to limit the present disclosure, and those skilled in the art may design alternative embodiments without departing from the scope of the appended claims. In the claims, any reference symbol between brackets shall not be constructed as limiting the claims. The word "comprise" or "include" does not exclude the presence of elements or steps which are not listed in the claims. The word "a" or "an" before elements does not exclude the presence of multiple such elements. In some embodiments, the present disclosure can be implemented by means of hardware including a plurality of different elements and a properly programmed computer. In device claims listing several means, several of these means can be embodied by one and the same item of hardware.

Use of the words first, second, third and the like does not indicate any ordering. In some embodiments, the words can be interpreted as names.

What is claimed is:

1. An image processing method applied to an electronic apparatus, comprising:
    acquiring an image;
    determining a feature map of the image based on an image tag classification model, wherein the image tag classification model comprises a plurality of classification tasks; and
    determining tags corresponding to the feature map based on the classification tasks, wherein each of the tags comprises a probability value,
    wherein said determining tags corresponding to the feature map based on the classification tasks comprises:
        determining an intermediate feature map of the feature map by performing a dimension reducing processing on the feature map through the image tag classification model; and
        determining a feature vector of the intermediate feature map under each of the classification tasks by performing an average pooling on the intermediate feature map through the image tag classification model, wherein each feature vector comprises a plurality of elements, and each of the elements comprises a probability value that a tag of the feature map is a tag of a corresponding classification task.

2. The method according to claim 1, wherein each of the classification tasks is one of a multi-tag classification task and a single-tag classification task.

3. The method according to claim 1, further comprising:
    selecting tags of the image from tags of the classification tasks according to the probability value of each of the tags.

4. The method according to claim 3, wherein said selecting tags of the image from tags of the classification tasks according to probability values comprises:
    determining first tags, wherein each probability value of the first tags is greater than a probability threshold; and
    determining the tags of the image from the tags of the classification tasks based on the first tags.

5. The method according to claim 1, wherein the image tag classification model comprises a convolutional neural network and a classifier; wherein the convolutional neural network is used to acquire the feature map of the image, and the classifier comprises the classification tasks.

6. The method according to claim 1, wherein the image tag classification model comprises a convolutional neural network and a plurality of classifiers; wherein the convolutional neural network is used to acquire the feature map of the image, and each of the plurality of classifiers comprises one classification task.

7. A training method for an image tag classification model, wherein the method is applied to an electronic apparatus, and the method comprises:
    acquiring sample images corresponding to each of a plurality of classification tasks, wherein each of the sample images has tag data, the tag data comprises a classification task to which the sample image belongs and at least one target tag corresponding to the sample image under the classification task to which the sample image belongs, and a probability value corresponding to each of the at least one target tag is 1 and each of probability values corresponding to other tags is 0 in a classification result of the sample image under the classification task to which the sample image belongs; and
    training the image tag classification model based on the sample images corresponding to each of a plurality of classification tasks,
    wherein said training the image tag classification model based on the sample images corresponding to each of a plurality of classification tasks comprises:
        determining a first feature map of each of the sample images through the image tag classification model, wherein each of the sample images corresponds to the at least one target tag and a probability value corresponding to each of the at least one target tag;
        determining a second feature map of the first feature map by performing a dimension reducing processing on the first feature map through the image tag classification model; and
        determining a first feature vector of the second feature map under each of the classification tasks by performing an average pooling on the second feature map through the image tag classification model, wherein each first feature vector comprises a plurality of elements, and each of the elements comprises a probability value that a tag of the first feature map is a tag of a corresponding classification task.

8. The method according to claim 7, wherein said acquiring sample images corresponding to each of a plurality of classification tasks comprises:

for each sample image, determining the classification task to which the sample image belongs and the at least one target tag corresponding to the sample image under the classification task to which the sample image belongs;

setting a probability value at a position of each of the at least one target tag to 1 in a classification result of the sample image under the classification task to which the sample image belongs; and setting a probability value at a position of each of tags other than the at least one target tag to 0 in a classification result of the sample image under each of the classification tasks, wherein each tag corresponds to a position in a classification result of a classification task to which the tag belongs.

9. The method according to claim 7, wherein said training the image tag classification model based on the sample images corresponding to each of a plurality of classification tasks comprises:

acquiring a prediction accuracy about each of the sample images based on the tags corresponding to each of the sample images, the probability value corresponding to each of the tags, the at least one target tag corresponding to each of the sample images and the probability value corresponding to each of the at least one target tag; wherein each of the classification tasks corresponds to a prediction accuracy, and the prediction accuracy about each of the sample images is determined based on prediction accuracies obtained by each of the sample image under the classification tasks; and updating model parameters of the image tag classification model according to the prediction accuracy.

10. A non-transitory computer-readable storage medium on which one or more programs is stored, wherein the one or more programs, when executed by a processor, causes the processor to perform an image processing method comprising:

acquiring an image;

determining a feature map of the image based on an image tag classification model, wherein the image tag classification model comprises a plurality of classification tasks; and determining tags corresponding to the feature map based on the classification tasks, wherein each of the tags comprises a probability value, wherein said determining tags corresponding to the feature map based on the classification tasks comprises:

determining an intermediate feature map of the feature map by performing a dimension reducing processing on the feature map through the image tag classification model; and determining a feature vector of the intermediate feature map under each of the classification tasks by performing an average pooling on the intermediate feature map through the image tag classification model, wherein each feature vector comprises a plurality of elements, and each of the elements comprises a probability value that a tag of the feature map is a tag of a corresponding classification task.

11. The non-transitory computer-readable storage medium according to claim 10, wherein each of the classification tasks is one of a multi-tag classification task and a single-tag classification task.

12. The non-transitory computer-readable storage medium according to claim 10, wherein the method further comprises:

selecting tags of the image from tags of the classification tasks according to the probability value of each of the tags.

13. The non-transitory computer-readable storage medium according to claim 12, wherein said selecting tags of the image from tags of the classification tasks according to probability values comprises:

determining first tags, wherein each probability value of the first tags is greater than a probability threshold; and determining the tags of the image from the tags of the classification tasks based on the first tags.

14. The non-transitory computer-readable storage medium according to claim 10, wherein the image tag classification model comprises a convolutional neural network and a classifier; wherein the convolutional neural network is used to acquire the feature map of the image, and the classifier comprises the classification tasks.

15. The non-transitory computer-readable storage medium according to claim 10, wherein the image tag classification model comprises a convolutional neural network and a plurality of classifiers; wherein the convolutional neural network is used to acquire the feature map of the image, and each of the plurality of classifiers comprises one classification task.

* * * * *